United States Patent
Wang et al.

(10) Patent No.: US 11,418,147 B2
(45) Date of Patent: Aug. 16, 2022

(54) INTEGRATED PHOTOVOLTAIC CABLE AND MANUFACTURING METHOD THEREOF

(71) Applicant: Hebei Huatong Wires and Cables Group Co., Ltd., Tangshan (CN)

(72) Inventors: Huai'an Wang, Tangshan (CN);
Shujun Zhang, Tangshan (CN);
Baolong Zhang, Tangshan (CN);
Xiaoyang Ge, Tangshan (CN);
Hongzhang Li, Tangshan (CN);
Hanyuan Dong, Tangshan (CN);
Zhenbiao Wang, Tangshan (CN)

(73) Assignee: HEBEI HUATONG WIRES AND CABLES GROUP CO., LTD., Tangshan (CN)

(*) Notice: Subject to any disclaimer, the term of this patent is extended or adjusted under 35 U.S.C. 154(b) by 156 days.

(21) Appl. No.: 17/035,948

(22) Filed: Sep. 29, 2020

(65) Prior Publication Data
US 2022/0021334 A1    Jan. 20, 2022

(30) Foreign Application Priority Data
Jul. 14, 2020 (CN) .......................... 202010671963.X

(51) Int. Cl.
*H01R 11/11* (2006.01)
*H02S 40/34* (2014.01)
(Continued)

(52) U.S. Cl.
CPC ............. *H02S 40/34* (2014.12); *H01R 4/184* (2013.01); *H01R 11/01* (2013.01); *H01R 11/09* (2013.01);
(Continued)

(58) Field of Classification Search
CPC ...... H01R 9/09; H01R 13/213; H01R 13/688; H01R 13/28; H01R 4/183; H01R 13/04; H01R 4/185
See application file for complete search history.

(56) References Cited

U.S. PATENT DOCUMENTS 5,577,927 A * 11/1996 Okada .................... H01R 4/34
439/907
7,867,044 B2 * 1/2011 Lee ........................ H01R 11/12
439/108
(Continued)

*Primary Examiner* — Phuong Chi Thi Nguyen
(74) *Attorney, Agent, or Firm* — Ostrager Chong Flaherty & Broitman P.C.

(57) ABSTRACT

An integrated photovoltaic cable having a connecting terminal and a housing injection-molded on the connecting terminal. The connecting terminal has a connecting sheet, a through hole, and a plurality of U-shape groove sheets. Exposed conductors obtained by peeling front ends of the photovoltaic cable are respectively placed into corresponding U-shape groove sheets and crimped by a crimping plier. A manufacturing method for manufacturing the integrated photovoltaic cable includes three steps of manufacturing a connecting terminal, crimping photovoltaic wires, and injection molding a housing. An improvement of the cable connecting structure simplifies the production, improves the connecting quality, and reduces a volume of an adapter. The conductor end and the U-shape groove are firmly and conveniently connected to ensure the connection quality, reduce a contact resistance of a connecting wire, and cause a smaller volume of the adapter.

8 Claims, 2 Drawing Sheets

(51) Int. Cl.
*H02S 40/36* (2014.01)
*H01R 4/18* (2006.01)
*H01R 11/01* (2006.01)
*H01R 11/09* (2006.01)
*H01R 43/05* (2006.01)
*H01R 43/24* (2006.01)

(52) U.S. Cl.
CPC ............. *H01R 43/05* (2013.01); *H01R 43/24* (2013.01); *H02S 40/36* (2014.12)

(56) References Cited

U.S. PATENT DOCUMENTS

| | | | |
|---|---|---|---|
| 8,340,527 B2* | 12/2012 | Elberbaum | G02B 6/4295 |
| | | | 398/113 |
| 9,825,375 B2* | 11/2017 | Naganishi | H01R 4/186 |
| 2004/0147172 A1* | 7/2004 | Brown | F24S 25/632 |
| | | | 439/701 |
| 2021/0210879 A1* | 7/2021 | Jerjian | H02G 3/30 |
| 2022/0048600 A1* | 2/2022 | Zimmermann | H02S 20/00 |

\* cited by examiner

INTEGRATED PHOTOVOLTAIC CABLE AND MANUFACTURING METHOD THEREOF

CROSS REFERENCE TO RELATED APPLICATION

This application claims the benefit of priority of Chinese Patent Application No. 202010671963.x, entitled "Integrated photovoltaic cable and manufacturing method thereof" filed with the China National Intellectual Property Administration on Jul. 14, 2020, which is incorporated herein by reference in its entirety.

TECHNICAL FIELD

The disclosure relates to a field of solar photovoltaic cables, and more particularly to an integrated photovoltaic cable and a manufacturing method thereof.

BACKGROUND

At present, small electric energy generated by all photovoltaic plates is required to be collected in a solar power station, each plate is equipped with a power source wire collecting box and a connector, and a larger network cable system with a net structure is thus needed to receive and transport the electric energy from all the wire collecting boxes into an inverter. The larger network cable is often located in a severe environment, which not only requires a very strong tensile capacity for meeting the waterproof requirement of IP68, but also can be preferably installed on the site. Furthermore, the network cable itself is required to have a low loss and a small connection volume, which raises a high requirement on the connector of the network cable.

The existing photovoltaic cable is generally connected by a copper sheet and a screw, wherein, the exposed conductor of the photovoltaic cable is wound around the screw to be screwed into the copper sheet, such that the connecting cable is clamped by the copper sheet and the screw. Such a connection has following defects: firstly, a contact of the photovoltaic cable has a small contact area and a large contact resistance with the copper sheet, which causes an increasing direct current resistance of an adapter; and secondly, such a connection requires complex operations, a poor product consistency, and a connection firmness difficult to check.

SUMMARY

The disclosure intends to provide a photovoltaic cable connector and a manufacturing method thereof, which solves problems of a big contact resistance of the connecting device in the prior art causing an increasing direct current resistance of the adapter, complex operations, a poor product consistency and a connecting firmness difficult to check.

In order to solve the above technical problems, the disclosure adopts following technical solutions:

The disclosure provides an integrated photovoltaic cable, which comprises a connecting terminal connected with a plurality of photovoltaic cables and a housing injection-molded on the connecting terminal;

the connecting terminal comprises a connecting sheet, the middle part of the connecting sheet is provided with a through hole, a plurality of U-shape groove sheets crimped with the photovoltaic cable are integrally formed on the connecting sheet, and a plurality of anti-skid ribs are provided on an inner surface of each U-shape groove sheet.

Furthermore, the connecting terminal is cross-shaped, the number of the U-shape groove sheets is four, and the connecting sheet is circular.

Furthermore, the connecting terminal is T-shape, the number of the U-shape groove sheets is three, and the connecting sheet is semicircular.

Furthermore, the connecting terminal is Y-shape, the number of the U-shape groove sheets is three, the connecting sheet are circular.

Furthermore, the connecting terminal is made of copper materials.

A manufacturing method of the integrated photovoltaic cable comprises following steps:

firstly, manufacturing a connecting terminal through stamping; secondly, placing exposed conductors obtained by peeling front ends of the photovoltaic cable respectively into corresponding U-shape groove sheets and crimping the exposed conductors by a crimping plier; then smearing waterproof glue on a peeled fracture of the photovoltaic cable; and finally, injection-molding a housing on the connecting terminal.

Furthermore, the method further comprises: wearing chemical protective gloves, and wiping a conductor of a exposed part of the photovoltaic cable by using a clean wiping cloth soaked with a solvent, to remove grease, oil, fingerprints, dust, a release agent and rust adhered to the conductor.

Furthermore, a thickness of a film of the waterproof glue coated on the conductor of the photovoltaic cable is 17.8-25.4 micrometers, and a length of the coated glue is 10-12 millimeters.

Compared with the prior art, the disclosure has the following beneficial technical effects:

According to the disclosure, an improvement of the cable connecting structure simplifies the production, improves the connecting quality, and reduces a volume of the adapter. The connecting sheet and the U-shape groove sheet are an integrated structure, and the cable and the groove on the connecting sheet adopt a crimping terminal mode, so that the conductor end and the groove are firmly and conveniently connected to ensure the connection quality, reduce a contact resistance of a connecting wire, and cause a smaller volume of the adapter; and the connecting terminal being cross-shaped, T-shape or Y-shape greatly improves the expansion connection mode.

BRIEF DESCRIPTION OF THE DRAWINGS

The disclosure is further illustrated in the following description with reference to the drawings.

Figure 1:
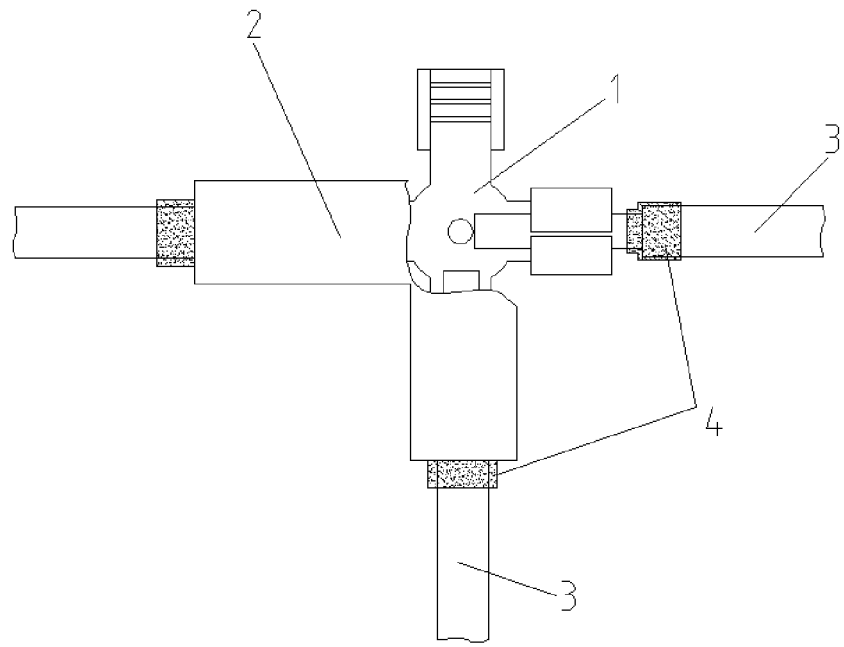
FIG. 1 is a schematic view showing a structure of an integrated photovoltaic cable according to the present disclosure.

Description of the reference numerals: 1. connecting terminal; 101. connecting sheet; 102. through hole; 103. U-shape groove sheet; 104. an anti-skid rib; 2. a housing; 3. a photovoltaic cable; 4. waterproof glue.

DETAILED DESCRIPTION OF THE EMBODIMENTS

In order for those skilled in the art to better understand the technical solutions of the present disclosure, the following detailed description of the present disclosure is made in combination with the accompanying drawings and the detailed description of the embodiments.

Embodiment One

Figure 2:
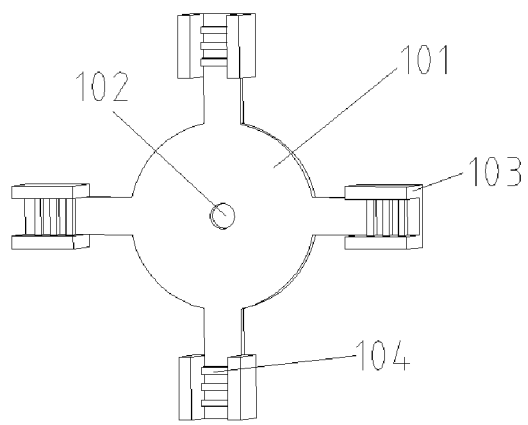
FIG. 2 shows a cross-shaped connecting terminal according to the present disclosure.

As shown in FIG. 1 and FIG. 2, the present embodiment discloses an integrated photovoltaic cable, which comprises a cupreous connecting terminal 1 and a housing 2 injection-molded on the connecting terminal 1.

The connecting terminal 1 comprises a connecting sheet 101, a through hole 102 is formed in the middle of the connecting sheet 101, a plurality of U-shape groove sheets 103 are integrally formed on the connecting sheet 101, and a plurality of anti-skid ribs 104 are provided on an inner surface of each U-shape groove sheet 103. The connecting sheet 101, the through hole 102 and the U-shape groove sheets 103 are formed by one-piece stamping. The through hole 102 is a process hole for producing terminals, used for positioning.

Exposed conductors obtained by peeling front ends of the photovoltaic cable 3 are respectively placed into corresponding U-shape groove sheet 103 and are crimped by a crimping plier. The anti-skid rib 104 can effectively squeeze the exposed conductors at the front ends of the photovoltaic cable 3 to prevent the conductors from skidding.

In this embodiment, the number of the U-shape groove sheets 103 is four, and the connecting sheet 101 is circular; the connecting sheet 101 is connected with the four U-shape groove sheets 103 in a cross shape, that is, the connecting terminal 1 is cross-shaped.

In order to ensure that connecting resistance of the connecting terminal 1 is not larger than conductor resistance of the copper wire, the thickness of the copper sheet used for manufacturing the connecting terminal 1 is h (mm), the width of the narrowest part of the connecting terminal 1 is t (mm), and the product of h and t needs to be greater than 1.2 times cross-sectional area of the photovoltaic wire (mm$^2$). In this embodiment, the width of connecting transition between the connecting sheet 101 and the U-shape groove sheet 103 is the narrowest.

Design current of the narrowest part of the connecting terminal 1 is not less than 6 A, material of the connector is H62 brass, copper content of the brass is 64%-68%, a heat conductivity coefficient of the brass is 108.9/(m·k), resistivity of the brass (at 20° C.) is 0.071 Ω·mm$^2$/m, the minimum size of H is 3.4 mm, the minimum size of the thickness t is 0.8 mm, the minimum resistance is 26.1 Ω/km, and the calculated current-carrying capacity of the 90° photovoltaic cable connector is 6.95 A. That is, the connector design requires that branch connectors can at least meet the requirement of current-carrying capacity of 6.95 A.

A manufacturing method of an integrated photovoltaic cable comprises the following steps: firstly, manufacturing a connecting terminal 1 through stamping; secondly, placing exposed conductors obtained by peeling front ends of the photovoltaic cable 3 respectively into corresponding U-shape groove sheets 103 and crimping the exposed conductors by a crimping plier; then smearing the waterproof glue 4 on a peeled fracture of the photovoltaic cable 3; and finally, injection-molding a housing 2 on the connecting terminal 1.

The length that waterproof glue 4 is smeared to the peeled fracture of the photovoltaic cable 3 is 10~12 millimeters, and an outer port of the housing 2 is located between the peeled fracture of the photovoltaic cable 3 and an outermost border of the waterproof glue 4, which effectively improves waterproof performance of the photovoltaic cable.

When the waterproof glue 4 is smeared, firstly, chemical protective gloves are worn. A conductor surface of an exposed part of the photovoltaic cable 3 is wiped by a clean wiping cloth soaked with a solvent (such as acetone, methyl ethyl ketone or isopropanol), to remove grease, oil, fingerprints, dust, a release agent, rust and other pollutants adhered to the conductor surface. The waterproof glue 4 is coated on the photovoltaic cable 3 by dip coating, brush coating or spraying, wherein a thickness of a coating film of the waterproof glue 4 is 17.8-25.4 micrometers. And finally, the waterproof glue 4 is dried and cured. For example, the mixed adhesive is exposed to air for drying for one hour at room temperature, or in a case that an oven heating method is adopted, the temperature is raised to 93° C. such that the drying time can be reduced to be within 10 minutes. While optimum bonding can be achieved by rapid forming after coating and drying the adhesive, glued parts can be placed for 4 to 5 days before bonding as long as the glued parts are carefully protected from contamination. Before forming, adhesive glued parts need to be preheated to 107-121° C., and then the adhesive glued parts are quickly placed into a mold.

Embodiment Two

The embodiment discloses an integrated photovoltaic cable, which comprises a cupreous connecting terminal 1 and a housing 2 injection-molded on the connecting terminal 1.

Figure 3:
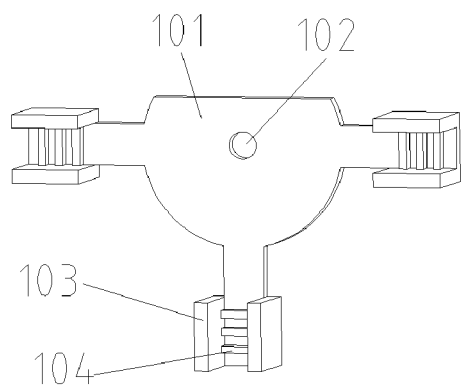
FIG. 3 shows a T-shape connecting terminal according to the present disclosure.

As shown in FIG. 3, the connecting terminal 1 comprises a connecting sheet 101, a through hole 102, and U-shape groove sheet3 103. In this embodiment, the number of the U-shape groove sheets 103 is three, and the connecting sheet 101 is semicircular; the connecting sheet 101 is connected with the three U-shape groove sheets 103 in a T shape, that is, the connecting terminal 1 is T-shape. The rest of the structure is identical to Embodiment One, and is not described herein again.

Embodiment Three

The embodiment discloses an integrated photovoltaic cable, which comprises a cupreous connecting terminal 1 and a housing 2 injection-molded on the connecting terminal 1.

Figure 4:
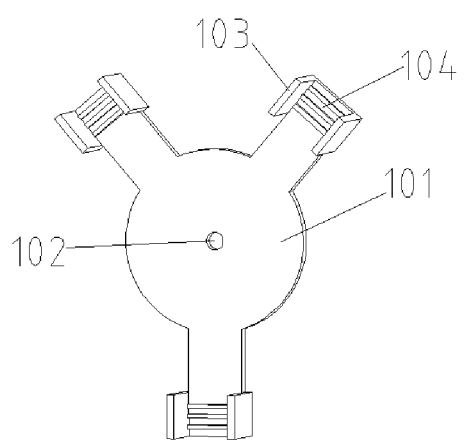
FIG. 4 shows a Y-shape connecting terminal according to the present disclosure.

As shown in FIG. 4, the connecting terminal 1 includes a connecting sheet 101, a through hole 102, and U-shape groove sheets 103. In this embodiment, the number of the U-shape groove sheets 103 is three, and the connecting sheet 101 is circular; the connecting sheet 101 is connected with the three U-shape groove sheets 103 Y-shape, that is, the connecting terminal 1 is Y-shape.

The above-described embodiments are only intended to illustrate the preferred embodiments of the present disclosure, and not to limit the scope of the present disclosure, and various modifications and improvements made to the technical solution of the present disclosure by those skilled in the art, without departing from the spirit of the present disclosure, should be within the protection scope defined by the claims of the present disclosure.

What is claimed:

1. An integrated photovoltaic cable, comprising a connecting terminal (1) used to connect with a plurality of photovoltaic cables (3) and a housing (2) injection-molded on the connecting terminal (1);

wherein, the connecting terminal (1) comprises a connecting sheet (101), a middle part of the connecting sheet (101) is provided with a through hole (102), a plurality of U-shape groove sheets (103) crimped with the photovoltaic cable (3) are integrally formed on the connecting sheet (101), and a plurality of anti-skid ribs (104) are provided on an inner surface of each U-shape groove sheet (103).

2. The integrated photovoltaic cable according to claim 1, wherein, the connecting terminal (1) is cross-shaped, a number of the U-shape groove sheets (103) is four, and the connecting sheet (101) is circular.

3. The integrated photovoltaic cable according to claim 1, wherein, the connecting terminal (1) is T-shape, a number of the U-shape groove sheets (103) is three, and the connecting sheet (101) is semicircular.

4. The integrated photovoltaic cable according to claim 1, wherein, the connecting terminal (1) is Y-shape, a number of the U-shape groove sheets (103) is three, the connecting sheet (101) are circular.

5. The integrated photovoltaic cable according to claim 1, wherein, the connecting terminal (1) is made of copper materials.

6. A manufacturing method for manufacturing an integrated photovoltaic cable comprises:
firstly, manufacturing a connecting terminal (1) through stamping;
secondly, placing exposed conductors obtained by peeling front ends of the photovoltaic cable (3) respectively into corresponding U-shape groove sheets (103) and crimping the exposed conductors by a crimping plier;
then smearing the waterproof glue (4) on a peeled fracture of the photovoltaic cable (3); and
finally, injection-molding a housing (2) on the connecting terminal (1).

7. The manufacturing method according to claim 6, wherein, the method further comprises: wearing chemical protective gloves, and wiping a conductor of a exposed part of the photovoltaic cable (3) by using a clean wiping cloth soaked with a solvent, to remove grease, oil, fingerprints, dust, a release agent and rust adhered to the conductor.

8. The manufacturing method according to claim 6, wherein, a thickness of a film of the waterproof glue (4) coated on the conductor of the photovoltaic cable (3) is 17.8-25.4 micrometers, and a length of the coated glue is 10-12 millimeters.

* * * * *